(12) United States Patent
Sung (10) Patent No.: US 8,384,697 B2
(45) Date of Patent: Feb. 26, 2013

(54) STYLUS DEVICE ADAPTED FOR USE WITH A CAPACITIVE TOUCH PANEL

(75) Inventor: Jamie Sung, Taichung (TW)

(73) Assignee: Dagi Corporation Ltd., Taichung (TW)

( * ) Notice: Subject to any disclaimer, the term of this patent is extended or adjusted under 35 U.S.C. 154(b) by 539 days.

(21) Appl. No.: 12/718,246

(22) Filed: Mar. 5, 2010

(65) Prior Publication Data

US 2010/0225614 A1 Sep. 9, 2010

(30) Foreign Application Priority Data

Mar. 9, 2009 (TW) ................................ 98203521 U (51) Int. Cl.
*G06F 3/033* (2006.01)
(52) U.S. Cl. ................... 345/179; 178/19.03; 178/19.01; 178/19.04; 345/173
(58) Field of Classification Search .......... 345/173–183; 178/18.01–18.11, 19.01–19.07, 20.01–20.04; 463/37–38
See application file for complete search history.

(56) References Cited

U.S. PATENT DOCUMENTS

| 5,453,759 | A | * | 9/1995 | Seebach | 345/158 |
| 5,706,026 | A | * | 1/1998 | Kent et al. | 345/156 |
| 5,912,662 | A | * | 6/1999 | Bunn et al. | 345/179 |
| 5,914,708 | A | * | 6/1999 | LaGrange et al. | 345/179 |
| 5,999,170 | A | * | 12/1999 | Ooura et al. | 345/179 |
| 6,621,697 | B2 | * | 9/2003 | O'Hara et al. | 361/679.41 |
| 7,030,860 | B1 | * | 4/2006 | Hsu et al. | 345/173 |
| 7,656,391 | B2 | * | 2/2010 | Kimura et al. | 345/173 |
| 8,111,246 | B2 | * | 2/2012 | Hwang et al. | 345/173 |
| 8,125,469 | B2 | * | 2/2012 | Badaye et al. | 345/179 |
| 8,130,209 | B2 | * | 3/2012 | Chang | 345/174 |
| 2002/0097232 | A1 | * | 7/2002 | Pogatetz et al. | 345/179 |
| 2005/0093835 | A1 | * | 5/2005 | Mortarelli | 345/179 |
| 2005/0190161 | A1 | * | 9/2005 | Hong et al. | 345/173 |
| 2007/0013681 | A1 | * | 1/2007 | Chou | 345/179 |
| 2008/0297493 | A1 | * | 12/2008 | Adkins | 345/179 |
| 2009/0278818 | A1 | * | 11/2009 | DiNozzi et al. | 345/179 |
| 2010/0006350 | A1 | * | 1/2010 | Elias | 178/18.06 |
| 2012/0043142 | A1 | * | 2/2012 | Grivna | 178/19.03 |

* cited by examiner

*Primary Examiner* — Lun-Yi Lao
*Assistant Examiner* — Gene W Lee
(74) *Attorney, Agent, or Firm* — Renner, Otto, Boisselle & Sklar, LLP (57) ABSTRACT

A stylus device is adapted for use with a capacitive touch panel, and includes a main body having a handle portion, and a transparent touch portion connected to the handle portion, adapted to be placed on the capacitive touch panel and having a flat touch surface. A transparent conductive membrane is formed on the touch portion and the handle portion, and covers the touch surface of the touch portion so that the transparent conductive membrane connects electrically a user's hand when the handle portion of the main body is held by the user's hand.

15 Claims, 8 Drawing Sheets

STYLUS DEVICE ADAPTED FOR USE WITH A CAPACITIVE TOUCH PANEL

CROSS-REFERENCE TO RELATED APPLICATION

This application claims priority of Taiwanese Patent Application No. 098203521, filed Mar. 9, 2009, which is hereby incorporated herein by reference in its entirety.

BACKGROUND OF THE INVENTION

1. Field of the Invention

The invention relates to a stylus, more particularly to a stylus device adapted for use with a capacitive touch panel.

2. Description of the Related Art

At present, touch-sense techniques have been widely applied to global positioning systems, personal digital assistants, cellular phones, palm-size computers and information appliances. Generally, touch-sense devices are of resistive, capacitive, surface acoustic wave sensitive, optic and electromagnetic. Particularly, a capacitive touch panel has been used in a handheld electronic device, such as a smart phone (e.g., an Apple iPhone) or a media player (e.g., an iPod Touch®).

The capacitive touch panel senses the position of a stylus that alters the transcapacitance coupling between row and column electrodes. For a capacitive touch panel, a user's finger can serve as a stylus in use. However, the user's finger may shield a part of an operating area of the capacitive touch panel. As a result, accurate position input cannot be obtained by means of the user's finger. Furthermore, a conventional stylus for a capacitive touch panel has a stylus tip with a certain touch area for touching the capacitive touch panel. However, the conventional stylus cannot accurately point to a position corresponding to a target pattern having an area smaller than the touch area.

Another conventional paintbrush stylus disclosed in U.S. Pat. No. 5,488,204 is used to produce paint-like strokes on a touch-sensor pad. However, such paintbrush stylus is relatively expensive and cannot prevent the aforesaid shielding problem during use. Therefore, accurate position input cannot be ensured.

SUMMARY OF THE INVENTION

Therefore, an object of the present invention is to provide a stylus device adapted for use with a capacitive touch panel that can overcome the aforesaid drawbacks of the prior art.

According to the present invention, there is provided a stylus device adapted for use with a capacitive touch panel. The stylus device comprises:

a main body having a handle portion, and at least one transparent touch portion connected to the handle portion, adapted to be placed on the capacitive touch panel and having a flat touch surface; and a transparent conductive membrane formed on the touch portion and the handle portion of the main body, and covering the touch surface of the touch portion of the main body so that the transparent conductive membrane is adapted to connect electrically a user's hand when the handle portion of the main body is held by the user's hand.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 1:
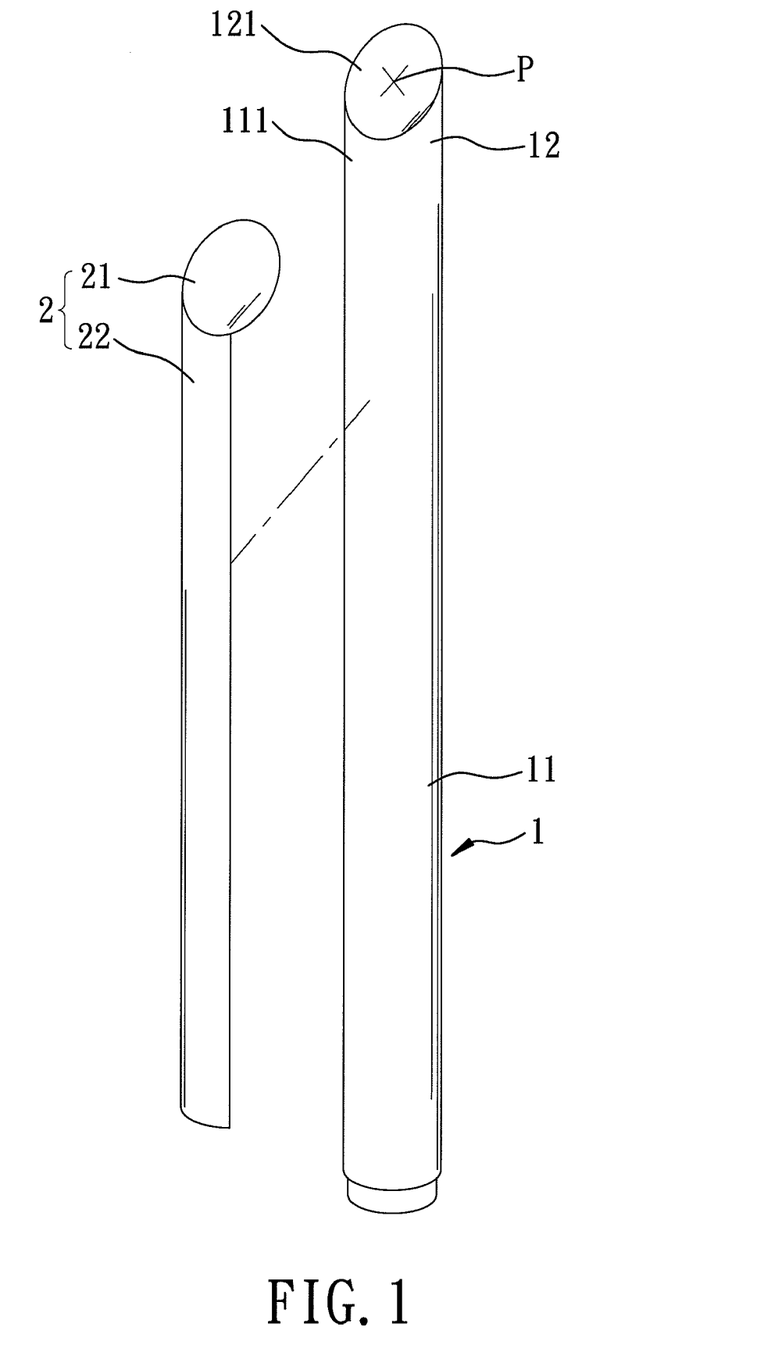
FIG. 1 is an exploded perspective view showing the first preferred embodiment of a stylus device according to the present invention.
Figure 2:
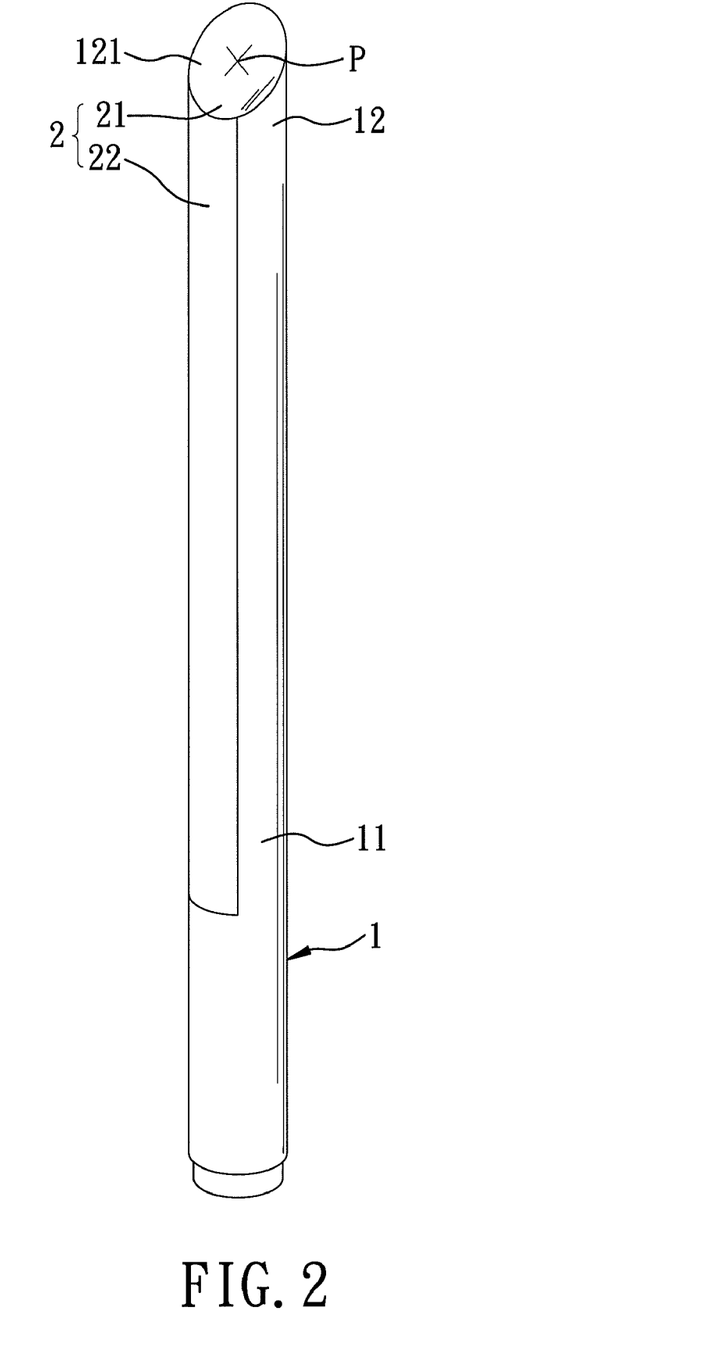
FIG. 2 is a perspective view showing the first preferred embodiment.
Figure 3:
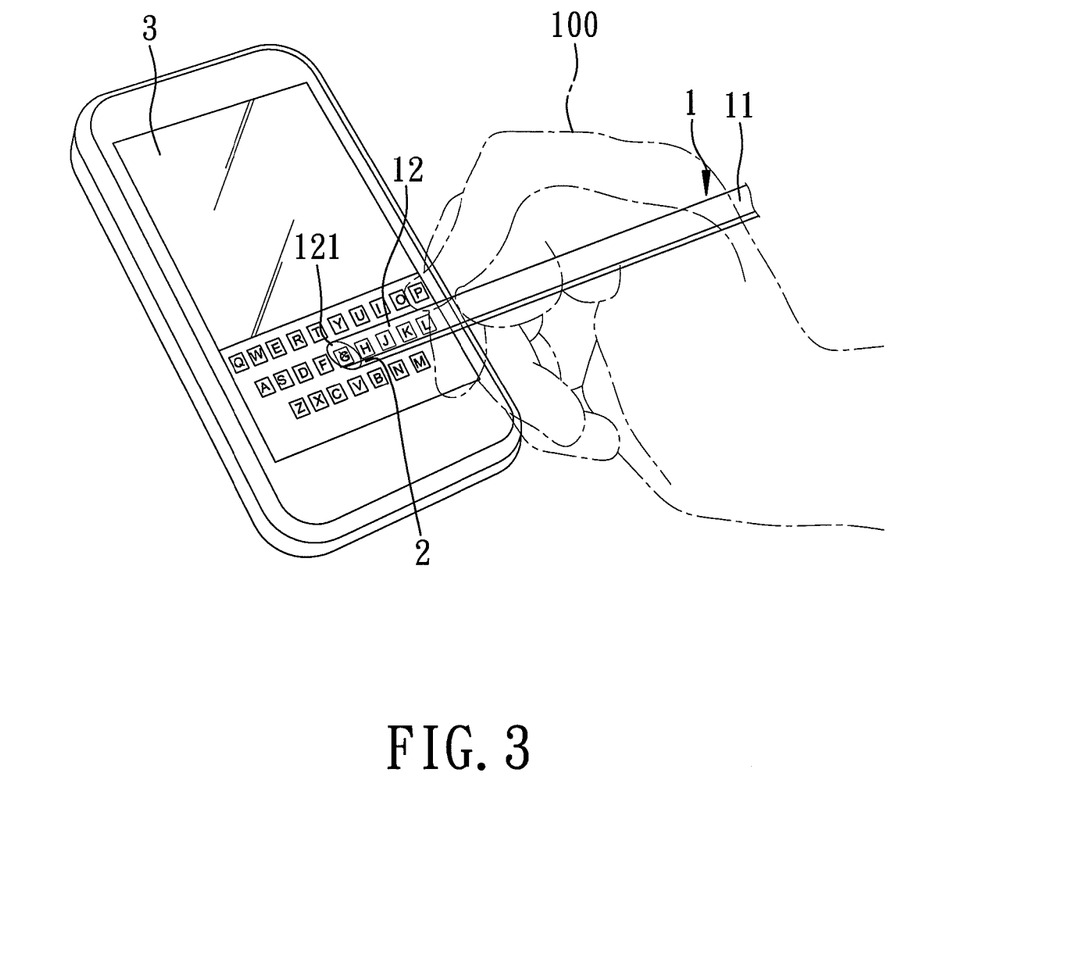
FIG. 3 is a fragmentary schematic view showing the first preferred embodiment when in a state of use.

Referring to FIGS. 1 to 3, the first preferred embodiment of a stylus device adapted for use with a capacitive touch panel 3 according to the present invention is shown to include an elongate main body 1 and a transparent conductive membrane 2.

In this embodiment, the main body 1 is transparent, and has a handle portion 11 and a transparent touch portion 12. The transparent touch portion 12 is connected integrally to the handle portion 11, is adapted to be placed on an operating area of the capacitive touch panel 3 (see FIG. 3), and has a flat touch surface 121 having an area greater than 4 mm$^2$. In this embodiment, the touch surface 121 of the touch portion 12 is adapted to face the operating area of the capacitive touch panel 3 when the touch portion 12 of the main body 1 is disposed on the capacitive touch panel 3, as shown in FIG. 3. The touch portion 12 has the transmittance greater than 30%. In this embodiment, the handle portion 11 is an insulator. The touch portion 12 and the handle portion 11 are made of the same material that is one of glass, quartz, lazurite, polycarbonate (PC), polyethyleneteraphthalate (PET), polymethylmethacrylate (PMMA), Arton, polyethersulfone (PES), polypropylene (PP), polyethylene (PE), ZEONOR, and combinations thereof. The touch portion 12 is formed with a visible position mark (P), such as a cross mark, disposed at a center of the touch surface 121. In other embodiments, the position mark (P) can be a spot mark.

The transparent conductive membrane 2 is formed on the touch portion 12 and the handle portion 11 of the main body 1 by coating, spraying, soaking, sputtering or evaporating, and covers the touch surface 121 of the touch portion 12 of the main body 1 so that the transparent conductive membrane 2 is adapted to connect electrically a user's hand 100 when the handle portion 11 of the main body 1 is held by the user's hand 100, as shown in FIG. 3. In this embodiment, the transparent conductive membrane 2 is made of one of indium tin oxide (ITO), indium zinc oxide (IZO), chrome (Cr), chrome oxide (CrO), zinc oxide (ZnO), titanium oxide (TiO), silver (Ag), and combinations thereof. The transparent conductive membrane 2 has a first membrane portion 21 formed on the touch portion 12 of the main body 1 and covering the touch surface 121 of the touch portion 12 of the main body 1, and a second membrane portion 22 formed on an outer annular surface of the handle portion 11 of the main body 1.

In such a configuration, since the touch portion 12 and the conductive membrane 2 are transparent, a desired target pattern shown in the operating area of the touch panel 3 is not shielded during use even though the desired target pattern has an area smaller than that of the touch surface 121 of the touch portion 12. Therefore, the stylus device of the present invention can achieve accurate position input.

Figure 4:
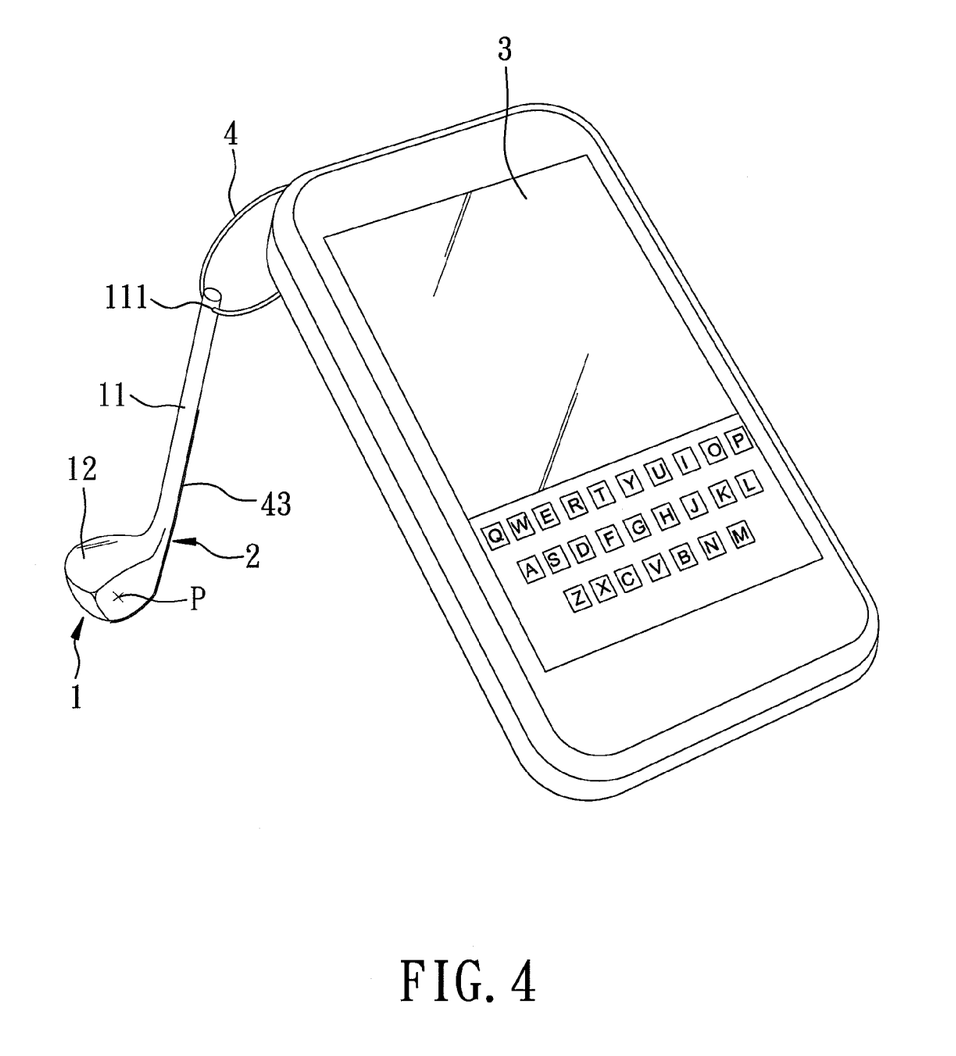
FIG. 4 is a perspective bottom view showing the second preferred embodiment of a stylus device according to the present invention when in a state of non-use.
Figure 5:
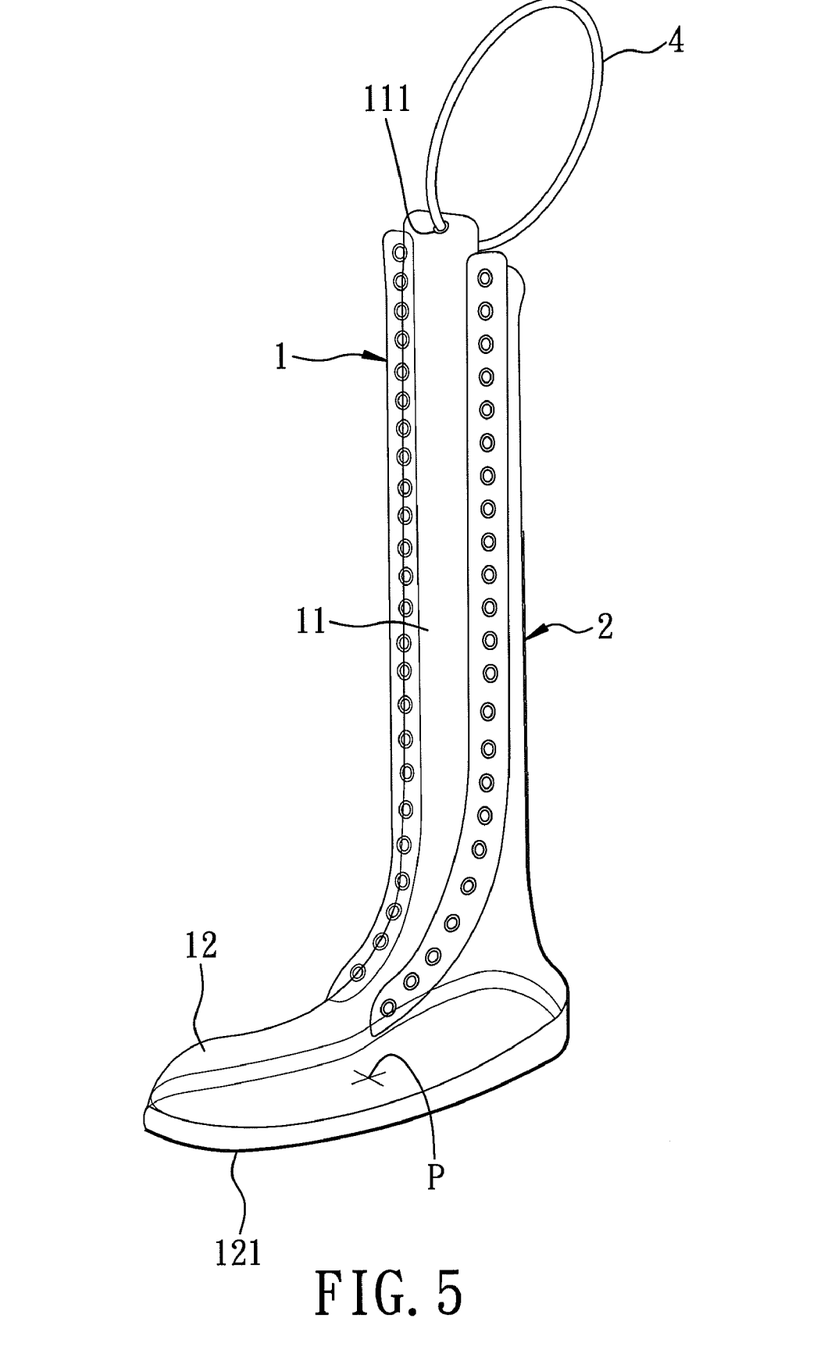
FIG. 5 is a perspective view of a variation of the second preferred embodiment.

FIG. 4 illustrates the second preferred embodiment of a stylus device adapted for use with a capacitive touch panel 3 according to this invention, which is a modification of the first preferred embodiment. As compared to the first preferred embodiment, the main body 1 is shaped as a golf club. Furthermore, the stylus device further includes a looped fastener 4 extending through a through hole 111 in the handle portion 11 of the main body 1 and adapted to be fastened detachably to an external electronic device containing the capacitive touch panel 3 when the stylus device is in a state of non-use, thereby resulting in convenience during use. FIG. 5 illustrates a variation of the second preferred embodiment, wherein the main body 1 is shaped as a boot. The looped fastener 4 is a rigid ring that can serve as a key chain, and the boot-shaped main body 1 can serve as a decorative article connected to the key chain. Therefore, the stylus device of the present invention facilitates carrying.

Figure 6:
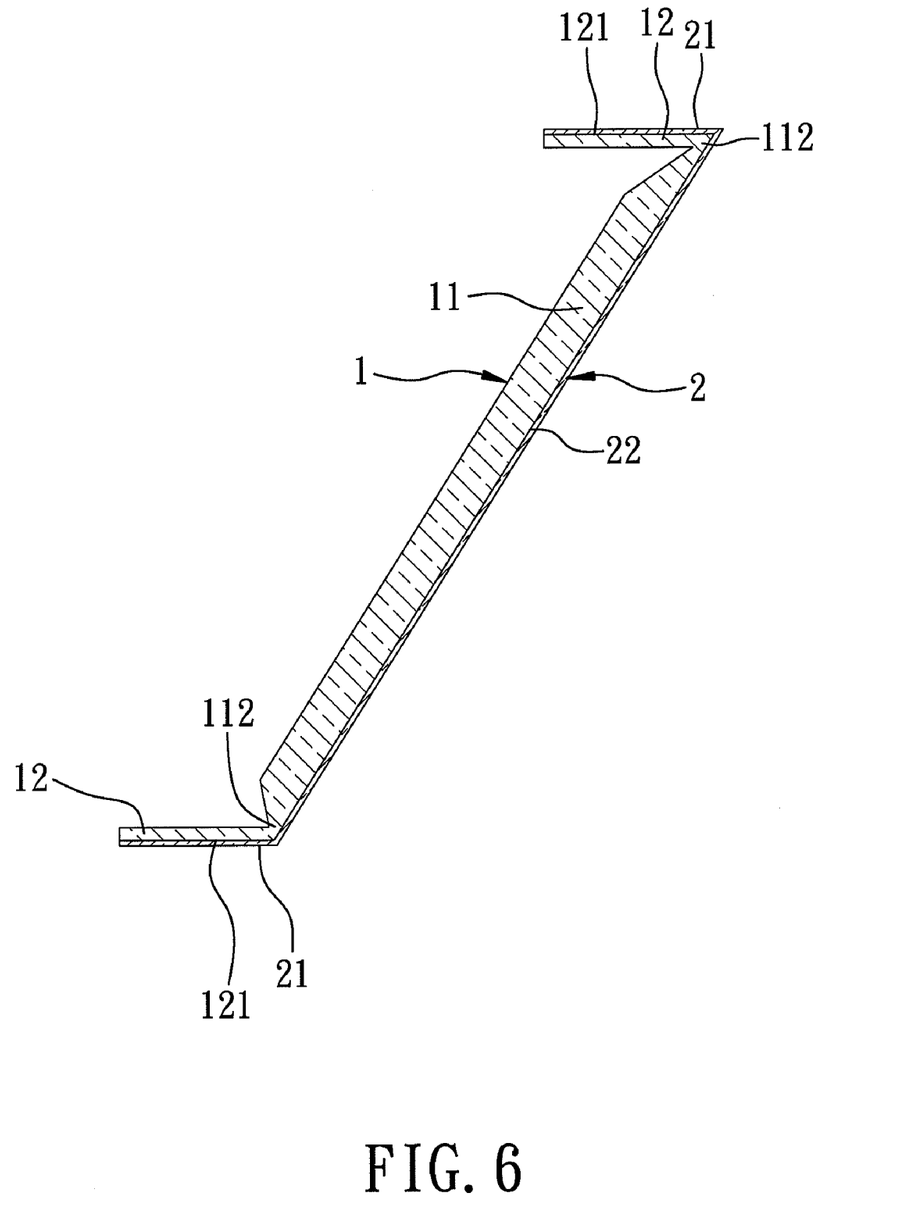
FIG. 6 is a schematic sectional view showing the third preferred embodiment of a stylus device according to the present invention.

FIG. 6 illustrates the third preferred embodiment of a stylus device adapted for use with a capacitive touch panel according to this invention, which is a modification of the first preferred embodiment. As compared to the first preferred embodiment, the main body 1 has two of the touch portions 12 connected respectively to opposite ends 112 of the handle portion 11. In this embodiment, the touch portions 12 are in the form of a sheet. Furthermore, the transparent conductive membrane 2 has two first membrane portions 21 formed respectively over the touch surfaces 121 of the touch portions 12 of the main body 1, and a second membrane portion 22 formed on an outer surface of the handle portion 11 of the main body 1, extending between the opposite ends 112 of the handle portion 11 of the main body 1 and connecting electrically the first membrane portions 21. In use, any one of the touch portions 12 is adapted to be placed on the operating area of the capacitive touch panel.

Figure 7:
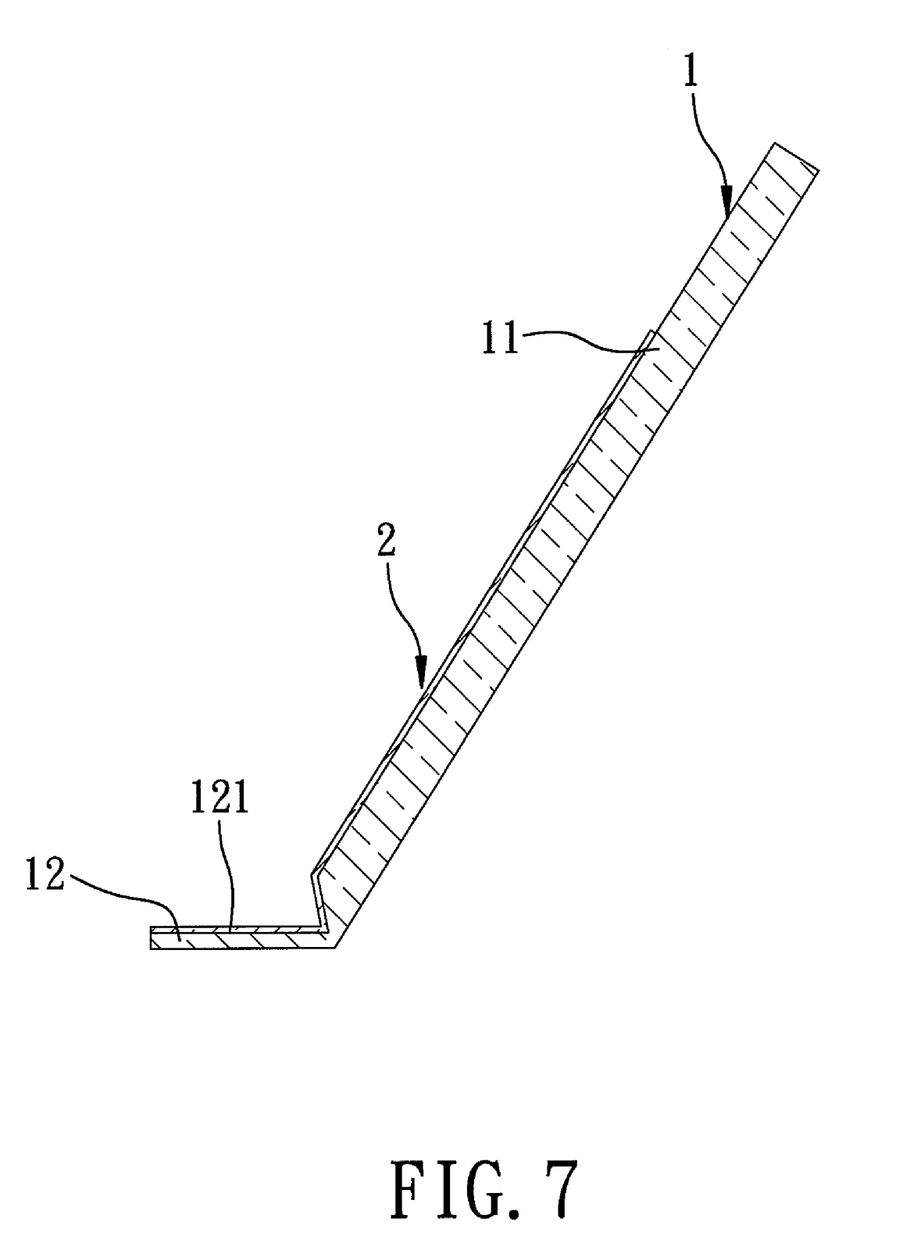
FIG. 7 is a schematic sectional view showing the fourth preferred embodiment.

FIG. 7 illustrates the third preferred embodiment of a stylus device adapted for use with a capacitive touch panel according to this invention, which is a modification of the first preferred embodiment. As compared to the first preferred embodiment, the touch portion 12 is in the form of a sheet, and has a top surface serving as the touch surface 121.

Figure 8:
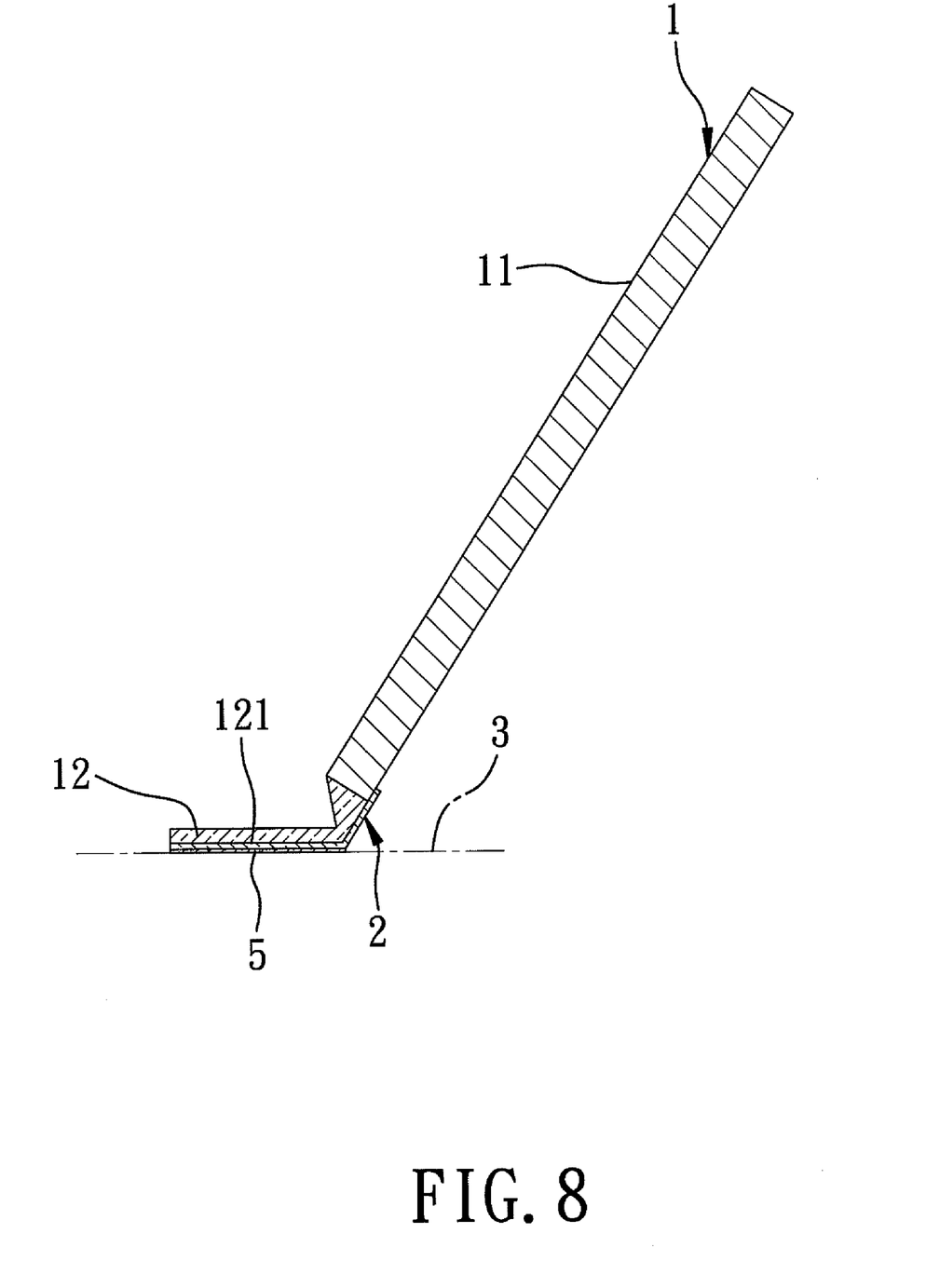
FIG. 8 is a schematic sectional view showing the fifth preferred embodiment of a stylus device according to the present invention.

FIG. 8 illustrates the third preferred embodiment of a stylus device adapted for use with a capacitive touch panel according to this invention, which is a modification of the first preferred embodiment. Unlike the first preferred embodiment, the handle portion 11 is a conductor and connects electrically the transparent conductive membrane 2, and the touch portion 12 of the main body 1 has a bottom surface serving as the touch surface 121. In use, a user's hand (not shown) contacts directly and electrically the handle portion 11 of the main body 1 such that the transparent conductive membrane 2 is connected electrically to the user's hand via the handle portion 11 of the main body 1.

Furthermore, the stylus device further includes a transparent protecting film 5 formed on and covering a portion of the transparent conductive membrane 2 that covers the touch surface 121 of the touch portion 12 of the main body 1 such that the transparent protecting film 5 is disposed between the portion of the transparent conductive membrane 2 and the capacitive touch panel 3 when the touch portion 12 of the main body 1 is placed on the capacitive touch panel 3. In this embodiment, the transparent protecting film 5 is made of one of PC and PET. Alternatively, the transparent protecting film 5 is in the form of transparent acrylic paint.

It is noted that, due to the presence of the transparent protecting film 5, wearing of the transparent conductive membrane 2 can be minimized, thereby prolonging the service life of the stylus device.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A stylus device adapted for use with a capacitive touch panel, comprising:
    a main body having a handle portion, and at least one transparent touch portion connected to said handle portion, adapted to be placed on the capacitive touch panel and having a flat touch surface; and
    a transparent conductive membrane formed on said touch portion and said handle portion of said main body and covering said touch surface of said touch portion of said main body so that said transparent conductive membrane is adapted to connect electrically a user's hand when said handle portion of said main body is held by the user's hand.

2. The stylus device as claimed in claim 1, wherein said touch portion of said main body has a bottom surface serving as said touch surface;
    said stylus device further comprising a transparent protecting film formed on and covering a portion of said transparent conductive membrane that covers said touch surface of said touch portion of said main body such that said transparent protecting film is disposed between the portion of said transparent conductive membrane and the capacitive touch panel when said touch portion of said main body is placed on the capacitive touch panel.

3. The stylus device as claimed in claim 2, wherein said transparent protecting film is made of one of polycarbonate (PC) and polyethyleneteraphthalate (PET).

4. The stylus device as claimed in claim 2, wherein said transparent protecting film is in the form of transparent acrylic paint.

5. The stylus device as claimed in claim 1, wherein said touch portion of said main body is in the form of a sheet, and has a top surface serving as said touch surface.

6. The stylus device as claimed in claim 1, wherein said touch portion of said main body is made of one of glass, quartz, lazurite, polycarbonate (PC), polyethyleneteraphthalate (PET), polymethylmethacrylate (PMMA), Arton, polyethersulfone (PES), polypropylene (PP), polyethylene (PE), ZEONOR, and combinations thereof.

7. The stylus device as claimed in claim 1, wherein said transparent conductive membrane is made of one of indium tin oxide (ITO), indium zinc oxide (IZO), chrome (Cr), chrome oxide (CrO), zinc oxide (ZnO), titanium oxide (TiO), silver (Ag), and combinations thereof.

8. The stylus device as claimed in claim 1, wherein said touch portion of said main body is formed with a visible position mark.

9. The stylus device as claimed in claim 8, wherein said position mark is a cross mark.

10. The stylus device as claimed in claim 1, wherein said touch surface of said touch portion of said main body has an area greater than 4 mm$^2$.

11. The stylus device as claimed in claim 1, wherein said touch portion of said main body has the transmittance greater than 30%.

12. The stylus device as claimed in claim 1, wherein said handle portion of said main body is a conductor and connects electrically said transparent conductive membrane.

13. The stylus device as claimed in claim 1, wherein:
said handle portion of said main body is an insulator; and
said transparent conductive membrane has a first membrane portion formed on said touch portion of said main body and covering said touch surface of said touch portion of said main body, and a second membrane portion formed on said handle portion of said main body, connecting electrically said first membrane portion, and adapted to contact electrically the user's hand when said handle portion of said main body is held by the user's hand.

14. The stylus device as claimed in claim 1, wherein:
said main body has two of said touch portions connected respectively to opposite ends of said handle portion; and
said transparent conductive membrane has two first membrane portions formed respectively over said touch surfaces of said touch portions of said main body, and a second membrane portion formed on an outer surface of said handle portion of said main body, extending between said opposite ends of said handle portion of said main body and connecting electrically said first membrane portions.

15. The stylus device as claimed in claim 1, further comprising a looped fastener extending through said handle portion of said main body and adapted to be fastened detachably to an external electronic device containing the capacitive touch panel.

\* \* \* \* \*